United States Patent
Underwood et al.

(10) Patent No.: US 12,401,512 B2
(45) Date of Patent: Aug. 26, 2025

(54) SECURE CONNECTION INITIATION TO PREVENT REPLAY ATTACKS IN AN ENCRYPTED NETWORK

(71) Applicant: HEWLETT PACKARD ENTERPRISE DEVELOPMENT LP, Spring, TX (US)

(72) Inventors: Keith D. Underwood, Spring, TX (US); Robert L. Alverson, Seattle, WA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 185 days.

(21) Appl. No.: 18/360,446

(22) Filed: Jul. 27, 2023

(65) Prior Publication Data

US 2024/0250822 A1     Jul. 25, 2024

Related U.S. Application Data

(60) Provisional application No. 63/440,592, filed on Jan. 23, 2023.

(51) Int. Cl.
*H04L 9/32* (2006.01)
*H04L 9/08* (2006.01)

(52) U.S. Cl.
CPC .......... *H04L 9/3213* (2013.01); *H04L 9/0825* (2013.01); *H04L 9/3297* (2013.01)

(58) Field of Classification Search
CPC .... H04L 9/3213; H04L 9/0825; H04L 9/3297
See application file for complete search history.

(56) References Cited

U.S. PATENT DOCUMENTS

| | | | | |
|---|---|---|---|---|
| 12,267,324 | B2 * | 4/2025 | Modi | H04L 63/0884 |
| 2004/0008625 | A1 * | 1/2004 | Lee | H04L 47/215 |
| | | | | 370/395.7 |
| 2014/0310349 | A1 * | 10/2014 | Rainisto | G06Q 50/01 |
| | | | | 709/204 |
| 2015/0063116 | A1 * | 3/2015 | Matsumura | H04L 47/215 |
| | | | | 370/235.1 |
| 2016/0197954 | A1 * | 7/2016 | Luo | H04L 63/1441 |
| | | | | 726/26 |
| 2016/0234022 | A1 * | 8/2016 | Motika | H04L 9/3213 |
| 2020/0136824 | A1 * | 4/2020 | Allen | H04L 9/30 |
| 2020/0335000 | A1 * | 10/2020 | Aluvala | H04W 4/08 |
| 2021/0409405 | A1 * | 12/2021 | Salajegheh | H04L 63/0807 |
| 2022/0327548 | A1 * | 10/2022 | Howald | H04L 9/3239 |

* cited by examiner

*Primary Examiner* — Techane Gergiso
(74) *Attorney, Agent, or Firm* — Dickinson Wright

(57) ABSTRACT

Systems and methods are provided for providing a shared token as part of establishing a communication connection with a network ("connection establishment") between a source device and a target device, after a previous communication connection to the network between the source device and the target device is closed or torn down, in helping to prevent future replay attacks.

20 Claims, 5 Drawing Sheets

SECURE CONNECTION INITIATION TO PREVENT REPLAY ATTACKS IN AN ENCRYPTED NETWORK

RELATED APPLICATIONS

This application claims the benefit of and priority to U.S. Provisional Patent Application No. 63/440,592, filed on Jan. 23, 2023, the contents of which is incorporated herein by reference in its entirety.

BACKGROUND

A replay attack occurs when an entity sniffs or eavesdrops on a secure network communication, intercepts a data packet that was transmitted using the secure network connection, and then fraudulently delays or resends the data packet. The header or other contents of the resent data packet can appear to originate from a source that has permissible access to the network, so the network may allow the entity to use the network under this presumption. As such, the entity fraudulently gains access to the network and can potentially access additional, protected data.

Replay attacks can also produce an unauthorized effect in the computer system. For example, by fraudulently resending the data packet, the improper data transmission in the network can cause silent corruption, job failure, or performance impact. The entity that fraudulently resends the data packet can cause issues and delays with transmitting permissible data packets in the network.

BRIEF DESCRIPTION OF THE DRAWINGS

The present disclosure, in accordance with one or more various examples, is described in detail with reference to the following figures. The figures are provided for purposes of illustration only and merely depict typical examples.

Figure 1:
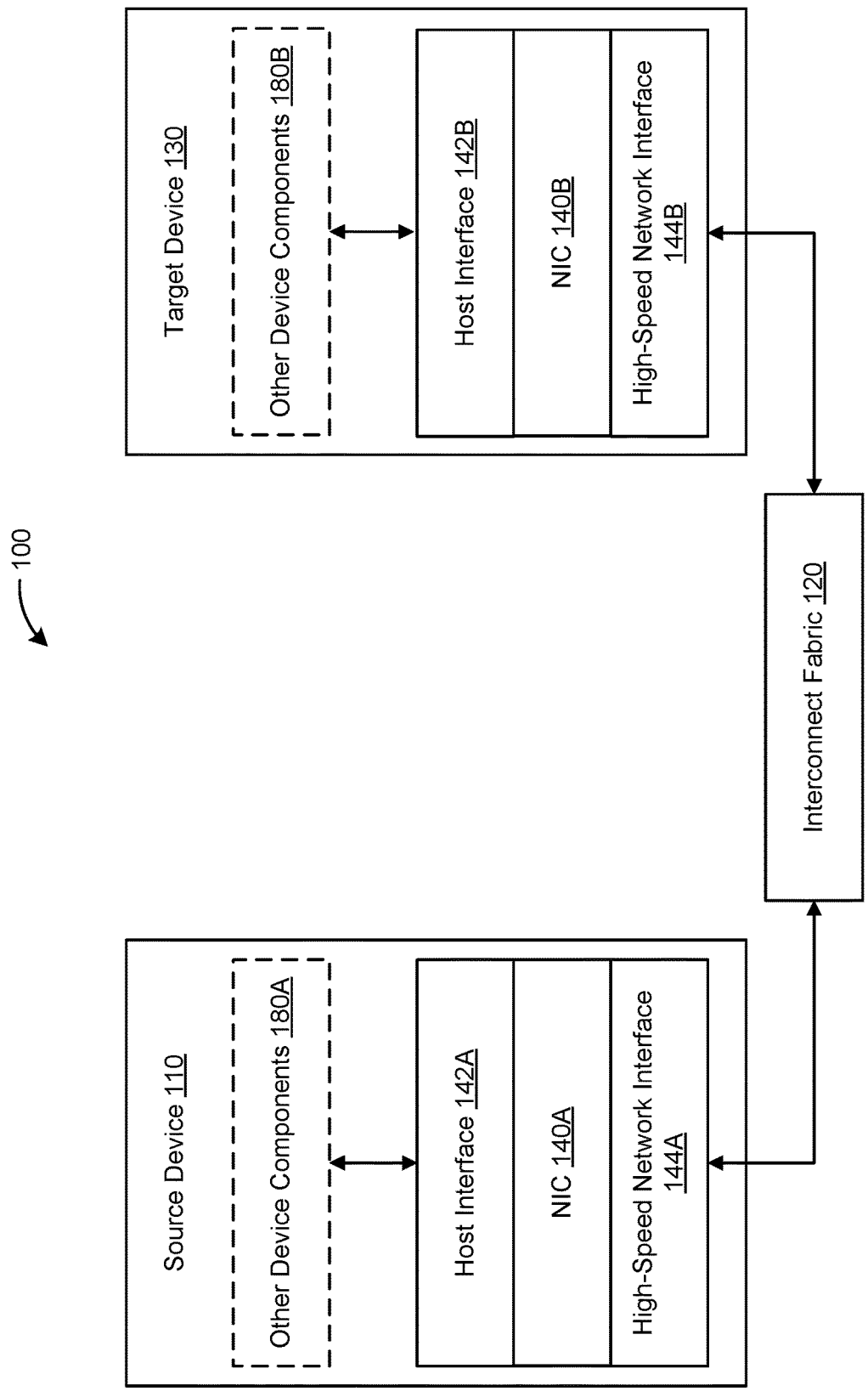
FIG. 1 shows a network for establishing a secure connection to help prevent replay attacks, in accordance with some examples of the disclosure.

The figures are not exhaustive and do not limit the present disclosure to the precise form disclosed.

DETAILED DESCRIPTION

Examples of the disclosure provide a shared token as part of establishing a communication connection with a network ("connection establishment") between a source device and a target device, after a previous communication connection to the network between the source device and the target device is closed or torn down, in helping to prevent future replay attacks. The connection establishment may be included with the data transfer process.

The source device and the target device may transmit messages over a shared network connection at a first time (e.g., "first connection") and attempt to reconnect the same two devices at a second time (e.g., "second connection"). During the first connection, for example, an application executed on a NIC of a source device can request a data operation (e.g., a "GET" or a "PUT" command of remote direct memory access (RDMA)) for a memory location of a target device. The NIC of the target device can receive the request, facilitate the execution of the operation, and send a response with the outcome of the execution. With the request for the data operation, the NIC of the source device can include a token with the request. When the response is provided by the target device to the source device, noting that the request is complete, the response may include the token. The connection may be removed, closed, or torn down so that a persistent connection between the source device and the target device is not maintained, yet the target device may store the token locally to identify the request/response from the source device. This allows the system that facilitates the connections between thousands of source and target devices to maintain fewer persistent connections between devices, especially while the devices are not actively transmitting data packets between each other. The system can run more efficiently overall and with less overhead processing activities to persist the connections.

A second connection may be initiated, for example, by an application executed on the NIC of the source device requesting a data operation (e.g., a "GET" or a "PUT" command of remote direct memory access (RDMA)) for a memory location of the target device. When the same devices attempt to reconnect in a second connection, the token that the source device transmitted during the first connection may be reused by the NIC at the source device. The target device may compare the received token and an identification of the source device with the stored token to confirm a previous connection establishment between the target device and the source device. Since the token is already used (e.g., exists in the storage of the target device), the target device may generate a second shared token and transmit it back to the source device in a response to the source device that rejects the second connection attempt using the first shared token. A third connection may be initiated by the source device using the second shared token, which includes the second shared token with the new request message. By checking the validity of the first shared token and transmitting the second shared token with the rejection message, the devices can confirm that the intended devices are communicating with each other in the network. This can also help prevent a fraudster from providing a previously used token to transmit requests to the target device. This can also help prevent a replay attack by the fraudster's device in reusing packets transmitted in the network to gain access to the network.

Technical improvements are realized throughout the disclosure. For example, the disclosed technology can improve authentication and authorization of connection establishment processes by incorporating shared tokens with the handshake process, in addition to helping to prevent a replay attack in continued communications within the distributed environment. In improving authentication and authorization, the entities are permitted to form a connection when the correct tokens are properly shared and stored. The system can ensure that the connection establishment between a source device and a target device is using a correct shared token without maintaining a persistent connection between the two devices. Additionally, by adjusting the communications between source device and target device using the systems and methods described herein, large network communication systems can be established between various entities to allow the devices to interoperate high performance computing (HPC) systems. The security protocols established at the different entities can be independent and individually optimized for each computing environment. This can allow multiple systems to process resource-intensive computations, like artificial intelligence (AI) and machine learning (ML), using datacenters that are unable or unwilling to commit to a single standardized protocol.

FIG. 1 shows an exemplary network for establishing a secure connection to help prevent replay attacks, in accordance with some examples of the disclosure. In example 100, source device 110 is connected via interconnect fabric 120 to target device 130. Source device 110 and target device 130 comprise NIC 140 (illustrated as NIC at source device 140A and NIC at target device 140B), Host Interface 142 (illustrated as Host Interface at source device 142A and Host Interface at target device 142B), High-Speed Network Interface 144 (illustrated as High-Speed Network Interface at source device 144A and High-Speed Network Interface at target device 144B), and other device components 180 (illustrated as other device components at source device 180A and other device components at target device 180B, connected via a bus or other connection medium, as further illustrated in FIG. 4 and FIG. 5).

Source device 110 and target device 130 can have a unique address or ID within interconnect fabric 120, and various types of devices and networks can be represented as source device 110 and target device 130. The devices may include, for example, a network device, a mobile device, a storage array, an InfiniBand (IB) based HPC network, an end host, and an IP/Ethernet network. In general, the devices can have edge ports and fabric ports. An edge port can couple to a device that is external to the fabric. A fabric port can couple to another switch within the fabric via a fabric link.

In some examples, traffic can be injected into interconnect fabric 120 via an egress port of source device 110, and leave interconnect fabric 120 via an ingress port of another (or the same) device, including target device 130. An ingress link can couple a Network Interface Controller (NIC) of a first device to an ingress edge port of a second device. Interconnect fabric 120 can then transport the traffic to an egress port of a source device, which in turn can deliver the traffic to a target device via another NIC.

NIC 140 may be designed to enable each corresponding device to communicate with interconnect fabric 120, comprising, for example, being equipped with Host Interface 142 (e.g., an interface for connecting to the host processor) and one High-Speed Network Interface 144 for communicating with a link coupled to interconnect fabric 120.

In some examples, Host Interface 142 can be a peripheral component interconnect (PCI) or a peripheral component interconnect express (PCIe) interface. Host Interface 142 can be coupled to a host via a host connection, which can include N (e.g., N can be 16 in some chips) PCIe Gen 4 lanes capable of operating at signaling rates up to 25 Gbps per lane. Host Interface 142 can facilitate a high-speed network connection, which can communicate with a link in interconnect fabric 120. Host Interface 142 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. High-Speed Network Interface 144 can support the Institute of Electrical and Electronics Engineers (IEEE) 802.3 Ethernet-based protocols as well as an enhanced frame format that provides support for higher rates of small messages.

NIC 140 can support one or more of: point-to-point message passing based on Message Passing Interface (MPI), remote memory access (RMA) operations, offloading and progression of bulk data collective operations, and Ethernet packet processing. When the host issues an MPI message, NIC 140 can match the corresponding message type. Furthermore, NIC 140 can implement both eager protocol and rendezvous protocol for MPI, thereby offloading the corresponding operations from the host.

NIC 140 may also support data operations, including PUT, GET, Atomic Memory Operations (AMO), or other remote direct memory access (RDMA)) commands, as well as providing reliable transport. For example, for NIC 140A at source device 110, NIC 140 can provide a retry mechanism for idempotent operations. An idempotent operation may be executed more than once without causing an error, while a non-idempotent operation can cause an error if the operation is executed more than once. Furthermore, connection-based error detection and retry mechanism can be used for ordered operations that may manipulate a target state. The hardware of NIC 140 can maintain the state necessary for the retry mechanism. In this way, NIC 140 can remove the burden from the host (e.g., the software). The policy that dictates the retry mechanism can be specified by the host via the driver software, thereby ensuring flexibility in NIC 140.

In some examples, NIC 140 can facilitate triggered operations, a general-purpose mechanism for offloading, and progression of dependent sequences of operations, such as bulk data collectives. NIC 140 can support an application programming interface (API) (e.g., libfabric API) that facilitates fabric communication services provided by interconnect fabric 120 to applications on a host device. NIC 140 can also support a low-level network programming interface, such as Portals API. In addition, NIC 140 can provide efficient Ethernet packet processing, which can include efficient transmission if NIC 140 is located at a source device, flow steering if NIC 140 is located at a target device, and checksum computation. Moreover, NIC 140 can support virtualization (e.g., using containers or virtual machines).

Figure 2:
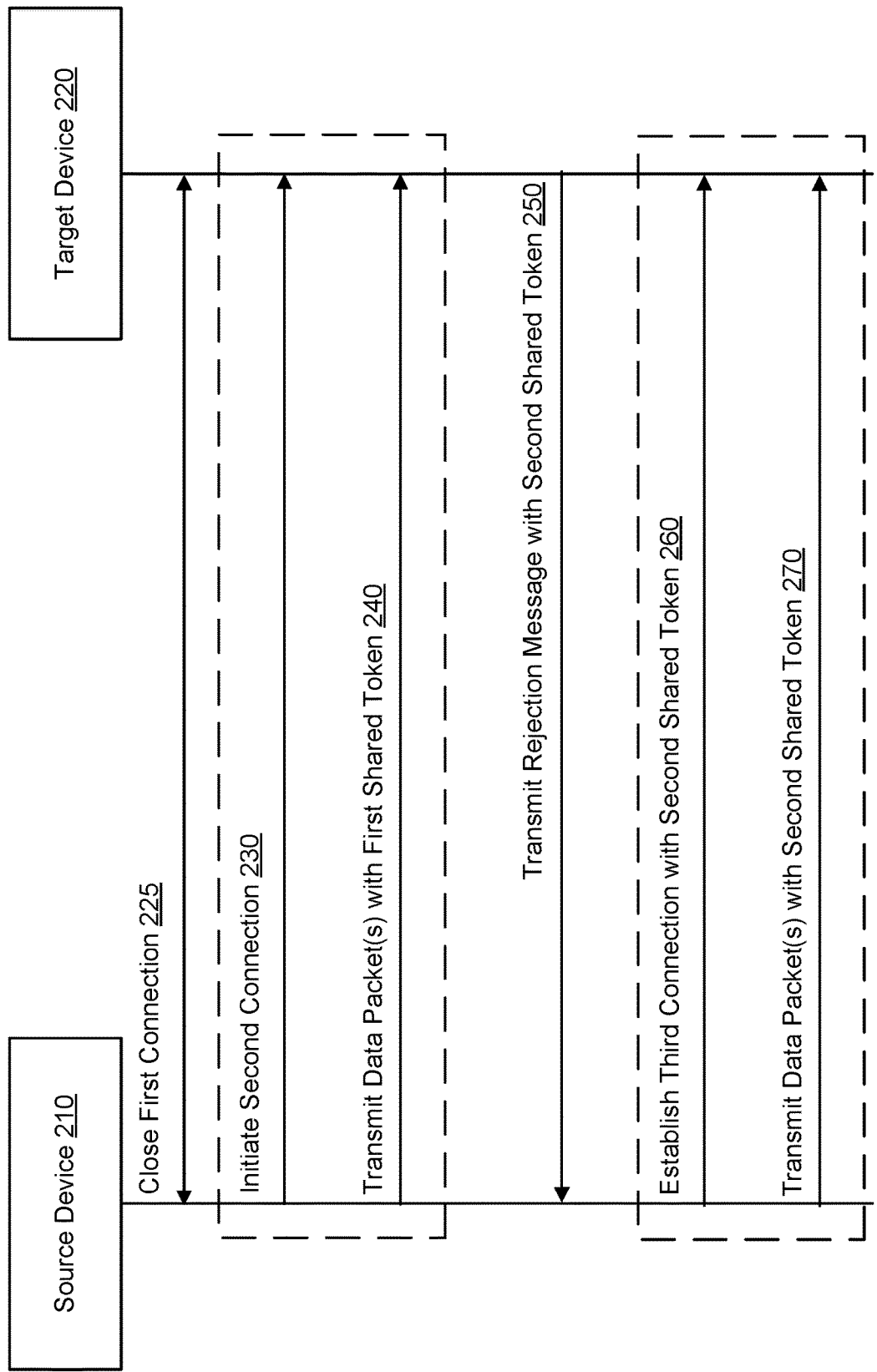
FIG. 2 illustrates a connection establishment process performed between a source device and a target device, in accordance with some examples of the disclosure.

FIG. 2 illustrates a connection establishment process performed between a source device and a target device, in accordance with some examples of the disclosure. In this example, source device 210 and target device 220 may correspond with source device 110 and target device 130 illustrated in FIG. 1, respectively. The connection establishment process can provide a shared token from a device permitted to communicate via the network (e.g., target device 220) as part of establishing an initial connection with the network (e.g., source device 210). The connection establishment may be included with the data transfer process between source device 210 and target device 220 and implemented using the NIC architecture described in FIG. 4.

At block 225, a first connection may be established, used to transmit data, and closed. For example, once the first connection is established, an application executed on a NIC of a source device can request a data operation (e.g., a "GET" or a "PUT" command of remote direct memory access (RDMA)) for a memory location of a target device. The first data packet can include a shared token. The shared token may be stored within the encrypted portion of the first data packet. The NIC of the target device can receive the request, facilitate the execution of the operation, and send a response with the outcome of the execution. With the request for the data operation, the NIC of the source device can include the token with the request. When the response is provided by the target device to the source device, noting that the request is complete, the response may include the token. The connection may be removed or broken down so that a persistent connection between the source device and the target device is not maintained, yet the target device may store the token locally to identify the request/response from the source device.

The shared token may correspond with various formats. For example, the shared token correspond with a sequence number established during a previous connection between source device 210 and target device 220. In some examples, the shared token may correspond with a current time synchronized across source device 210 and target device 220. In some examples, the shared token may correspond with a list of usable tokens where usage of each of the usable tokens is tracked by source device 210 and target device 220.

A first example of a shared token would be a sequence number. When the shared token is generated using a sequence number, the shared token may correspond with the next expected sequence number that was used during the last time a connection existed between the nodes. In some examples, this form of shared token can be stored more efficiently than a typical connection state. Source device 210 and target device 220 can use a simple data structure and local memory to store this sequence number after the connection state for the last connection has been torn down (or the devices are disassociated).

A second example would use the current time. For example, in a system where the time is synchronized across devices/systems, the current time could be used as a shared token. In some examples, the current time could be used as a shared token with guarantees that two devices would not attempt to establish a connection twice within a window or range of time. The window or range of time can be somewhat narrow. In this example, the system can implement the range of time that includes the current time. The range of time could be used as the token and the connection could be maintained at least for the duration of the range of time. While the connection is maintained, the system can prevent re-establishment of a connection from occurring during the range of time.

A third example may implement a list of usable tokens for connection establishment. When the shared token is generated using a list of usable tokens for connection establishment, the shared token may correspond with one of the usable tokens from the list. Source device 210 and target device 220 could track which tokens had been used by peer nodes, which can allow the used shared token to be retired, or when it should not be used anymore for connection establishment. One characteristic of this scheme is that connection establishment may be lightweight, and a connection establishment rate may be less than a packet acceptance rate. For example, a connection overhead can be executed over a number clock cycles (i.e., 10-20 nanoseconds), but not a round trip time (2-5 microseconds). The dynamic connections that are executed during a round-trip time before the connection can be used may not qualify has a high enough performance in an acceptable range. In some examples, the connection establishment may execute a multi-cycle lookup. Even in systems that process one packet per cycle, a 16-cycle penalty for connection establishment may be reasonable. The contrast is that a round-trip time can be several microseconds, whereas a lookup might be a few nanoseconds.

At block 230, a second connection may be initiated after the first connection is closed or torn down. For example, the first data packet of a connection handshake or connection establishment process can be transmitted from source device 210 to target device 220 in an attempt to establish a connection between the two devices. In some examples, source device 210 encrypts a portion of the first data packet used in a connection handshake using a key. The key may be received from a key server prior to receiving the message requesting the communication establishment and stored at the NIC of source device 210. In some examples, the key may be delivered as an encrypted key (e.g., from a key server accessible on the interconnect fabric of the network).

At block 240, a second data packet (and subsequent data packets) can be transmitted from source device 210 to target device 220. The transmission of the second data packet can be initiated prior to receiving a confirmation from target device 220 (e.g., with respect to block 230). The confirmation may identify that the connection is initiated between source device 210 to target device 220 in response to the first connection establishment process.

While the first connection establishment is being performed, source device 210 may continue to transmit data packets after the first data packet. In some examples, when a connection establishment is successful, all packets sent after the connection request that succeeded (possibly already in flight) do not need to be resent. Data packets sent between a first unsuccessful connection establishment and a second successful connection establishment may be resent.

At block 250, a rejection message is transmitted with a second shared token. For example, if target device 220 determines that the shared token has been used before, it can transmit a rejection message to source device 210 in response to the attempted connection establishment. In another example, if target device 220 determines that the shared token is expired, it can transmit a rejection message to source device 210 in response to the attempted connection establishment.

The rejection message can include a second shared token in its encrypted portion of the message. The second shared token can be received by source device 210 and used in subsequent attempted connection establishments. When the portion of the message is encrypted, source device 210 can decrypt the portion of the message using the key from the key server. As discussed herein, the key may have been received prior to receiving the message requesting the communication establishment and the key may be stored at the NIC of source device 210 (e.g., absent transmitting the key during the connection establishment process).

At block 260, a third connection establishment process can be initiated. For example, when source device 210 receives the rejection message, source device 210 can decrypt the message and identify the second shared token. In some examples, source device 210 may store the second shared token locally and delete the first shared token. Source device 210 can initiate a third connection establishment with the second shared token.

By checking the validity of the first shared token and transmitting the second shared token with the rejection message, the devices can also help prevent a replay attack from random packets transmitted in the network.

At block 270, a second data packet (and subsequent data packets) can be transmitted from source device 210 to target device 220. The transmission of the second data packet can be initiated prior to receiving a confirmation from target device 220. The confirmation may identify that the third connection is established between source device 210 to target device 220 in response to the third connection establishment process.

In some examples, target device 220 may access the stored data packets received pursuant to the second connection establishment process and not access the received data packet received pursuant to the third connection establishment process.

In some examples, the data packets that are received before a successful connection establishment may be dropped or deleted so that the main memory of the system will not be affected (e.g., to store the data packets). In other examples, source device 210 may continue to transmit data packets after the first data packet while the third connection establishment is being performed.

Once the connection establishment process is successful, transmissions of additional data packets between source device 210 and target device 220 can continue. For example, an application, which may run on the NIC of source device 210, can request a data operation (e.g., a "GET" or a "PUT" command of remote direct memory access (RDMA)) for a memory location of target device 220. The NIC of target device 220 can receive the request, facilitate the execution of the operation, and send a response to source device 210 with the outcome of the execution. Examples of an outcome can include, but are not limited to, one or more values generated from a computation associated with the operation, an indicator that indicates successful or unsuccessful execution of the operation, a memory location or index associated with the operation, and information indicating the state of a data structure based on the execution of the operation on the data structure.

Other operations may be initiated as well. For example, RDMA operations may include, but are not limited to, atomic memory operations, adding data to a queue, and indicating the completion of an operation. Since RDMA operations can be issued from source device 210 and transferred across the interconnect fabric (e.g., interconnect fabric 120 in FIG. 1) to target device 220, these operations may be executed based on a request-response communication protocol between the source and target NICs.

In some examples, while the second connection establishment is being performed, the source device may continue to transmit data packets after the first data packet. In some examples, when the second connection establishment is successful, all packets sent after the connection request that succeeded (possibly already in flight) do not need to be resent. Data packets sent between a first unsuccessful connection establishment and a second successful connection establishment may be resent.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 3:
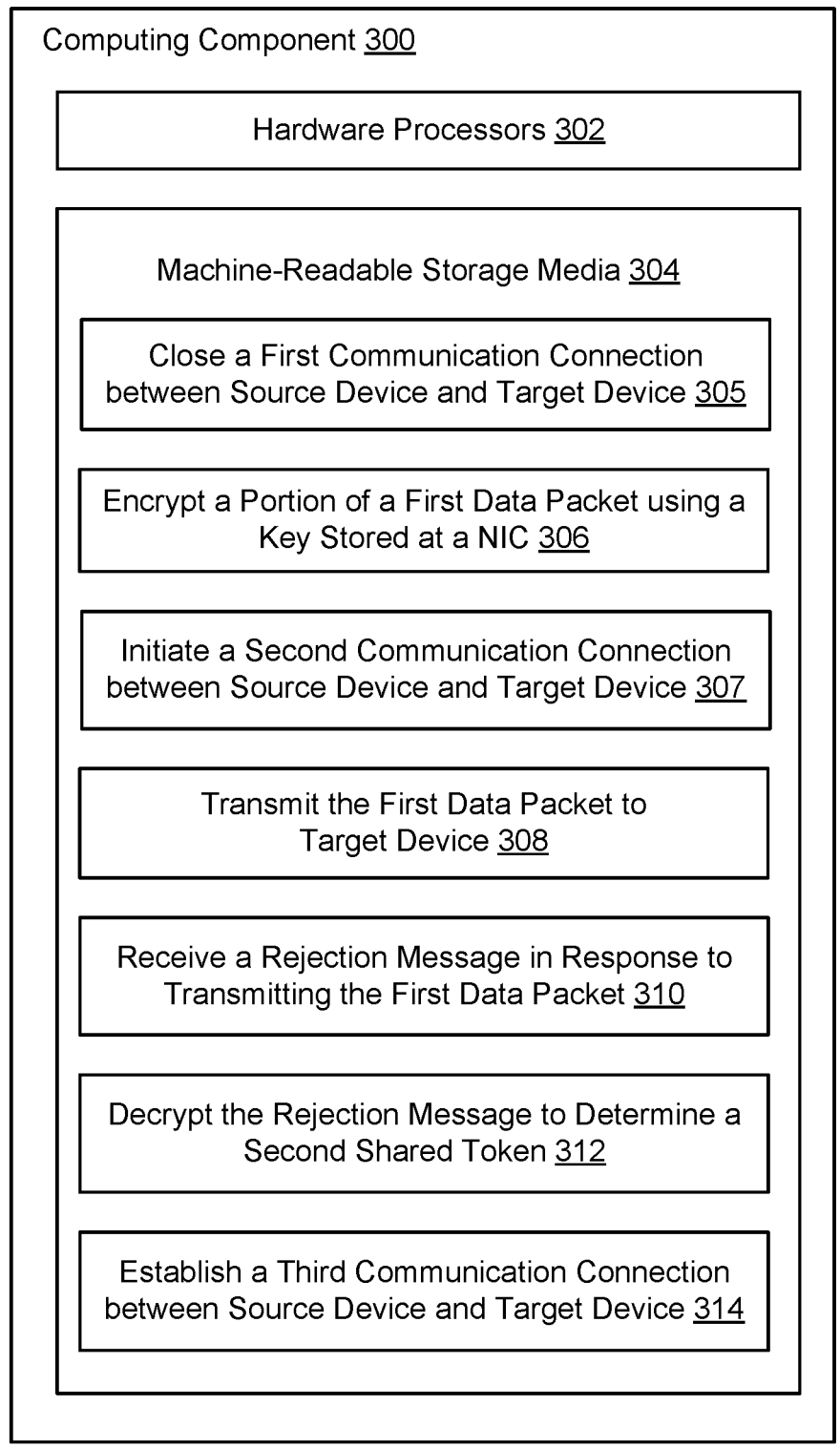
FIG. 3 is an example computing component that may be used to implement various features of examples described in the present disclosure.

FIG. 3 illustrates an example computing component that may be used to implement the secure connection initiation to prevent replay attacks in an encrypted network, in accordance with various examples. Referring now to FIG. 3, computing component 300 may be, for example, a server computer, a controller, or any other similar computing component capable of processing data. In the example implementation of FIG. 3, the computing component 300 includes a hardware processor 302, and machine-readable storage medium for 304.

Hardware processor 302 may be one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions 305-314, to control processes or operations for implementing the dynamically modular and customizable computing systems. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 304 may be a non-transitory storage medium, where the term "non-transitory" does not encompass transitory propagating signals. As described in detail below, machine-readable storage medium 304 may be encoded with executable instructions, for example, instructions 305-314.

Hardware processor 302 may execute instruction 305 to close a first communication connection via a communication network at a first time between a source device and a target device. In some examples, the first communication connection may be closed when a series of data packets are transmitted from the source device and the target device. At least one data packet in the series of data packets may comprise a first shared token that is stored by the target device after the first communication connection is closed or inactive.

In some examples, hardware processor 302 may execute an instruction prior to instruction 305 to transmit a series of data packets from a source device to a target device. In some examples, at least one data packet in the series of data packets comprises the first shared token.

Hardware processor 302 may execute instruction 306 to encrypt a portion of a first data packet. The encryption may be executed using a key stored at the NIC of the source device. In some examples, the first data packet corresponding with a request by the source device to initiate a data operation at the target device.

Hardware processor 302 may execute instruction 307 to initiate a second communication connection between source device and target device. The second communication connection may be initiated at a second time after the first time, which corresponds with closing the first communication connection between the source device and the target device.

Hardware processor 302 may execute instruction 308 to transmit the first data packet to the target device. The transmission may be executed by the source device to a target device. The first data packet comprising a first shared token within the encrypted portion of the first data packet. In some examples, the communication connection between the source device and the target device may be inactive when the first data packet is transmitted.

Hardware processor 302 may execute instruction 310 to receive a rejection message in response to transmitting the first data packet. The rejection message may be received by the source device from the target device. The rejection message may include a second shared token in an encrypted portion of the rejection message. The encrypted portion of the rejection message may be encrypted using the key stored at the NIC of the source device.

Hardware processor 302 may execute instruction 312 to decrypt the rejection message to determine a second shared token. The decryption may be implemented by the source device using the key stored at the NIC of the source device. The encryption of the rejection message may be implemented using a second key stored at the NIC of the target device.

Hardware processor 302 may execute instruction 314 to establish a third communication connection. The transmission may be executed to transmit a second data packet comprising the second shared token. The third communication connection may be established via the communication network. The third communication connection may be used to transmit the second data packet comprising the second shared token within the encrypted portion of the second data packet.

Figure 4:
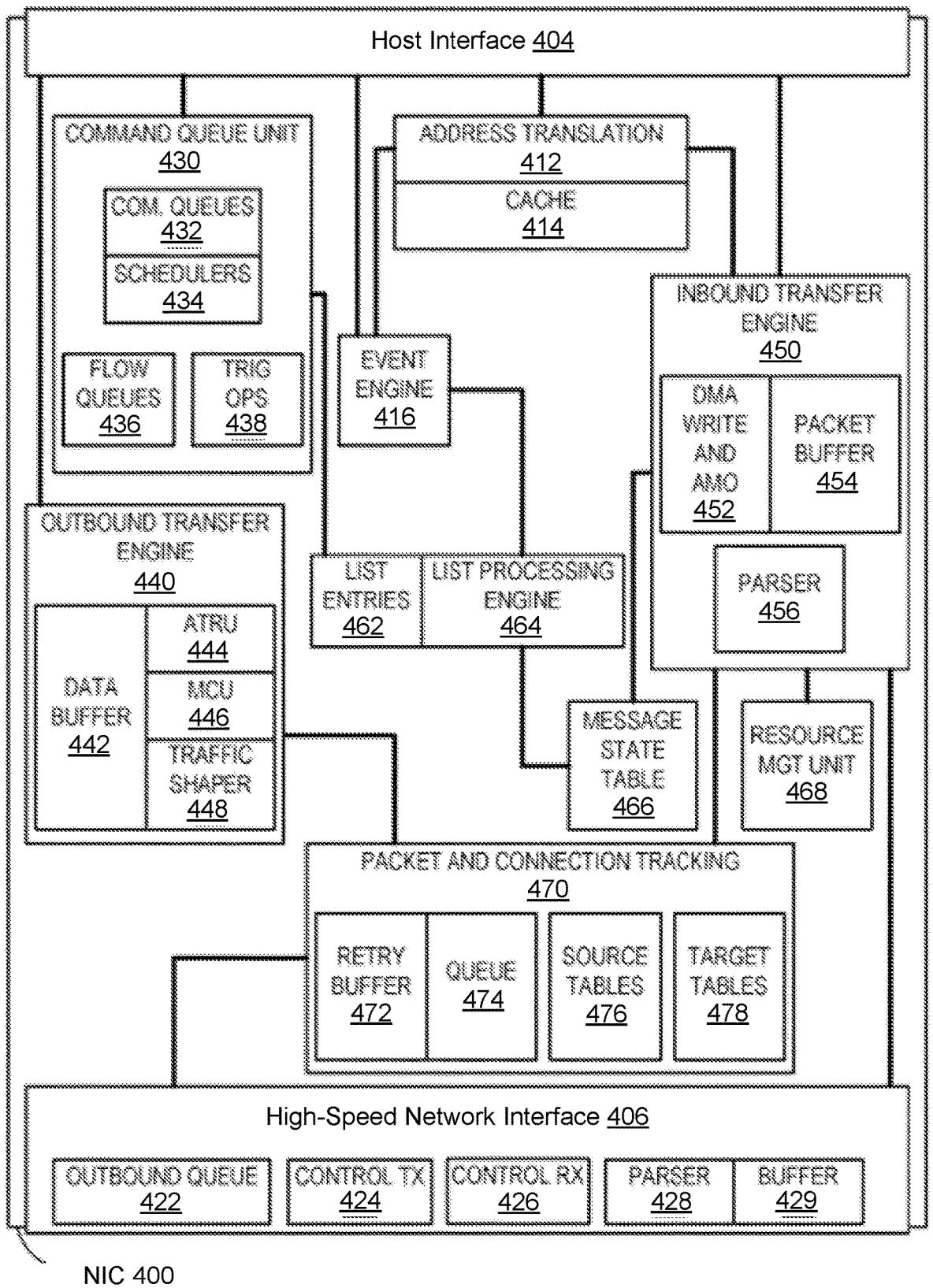
FIG. 4 shows an exemplary architecture of NIC, in accordance with some examples of the disclosure.

FIG. 4 shows an exemplary architecture of NIC 400. Source device and target device illustrated herein may comprise NIC 400, Host Interface 404, High-Speed Network Interface 406, and other device components. In some examples, Host Interface 404 can be a peripheral component interconnect (PCI) or a peripheral component interconnect express (PCIe) interface. Host Interface 404 can be coupled to a host via a host connection, which can include N (e.g., N can be 16 in some chips) PCIe Gen 4 lanes capable of operating at signaling rates up to 25 Gbps per lane. Host Interface 404 can facilitate a high-speed network connection, which can communicate with a link in interconnect fabric. Host Interface 404 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. High-Speed Network Interface 406 can support the Institute of Electrical and Electronics Engineers (IEEE) 802.3 Ethernet-based protocols as well as an enhanced frame format that provides support for higher rates of small messages.

For example, the port macro of High-Speed Network Interface 406 can facilitate low-level Ethernet operations, such as physical coding sublayer (PCS) and media access control (MAC). In addition, NIC 400 can provide support for link layer retry (LLR). Incoming packets can be parsed by parser 428 and stored in buffer 429. Buffer 429 can be a PFC Buffer provisioned to buffer a threshold amount (e.g., one microsecond) of delay bandwidth. High-Speed Network Interface 406 can also include control transmission unit 424 and control reception unit 426 for managing outgoing and incoming packets, respectively.

In some examples, source device may transmit a series of data packets that are received at High-Speed Network Interface 406, parsed by parser 428, and stored in buffer 429 of target device, during each of the first communication connection, second communication connection, or third communication connection between source device and target device. Control transmission unit 424 and control reception unit 426 of target device may also manage outgoing and incoming packets from source device.

NIC 400 can include a Command Queue (CQ) unit 430. Command queue unit 230 can be responsible for fetching and issuing host side commands. Command queue unit 430 can include command queues 432 and schedulers 434. Command queues 432 can include two independent sets of queues for initiator commands (PUT, GET, etc.) and target commands (Append, Search, etc.), respectively. Command queues 432 can be implemented as circular buffers maintained in the memory of NIC 400.

Applications running on the host can write to command queues 432 directly. Schedulers 434 can include two separate schedulers for initiator commands and target commands, respectively. The initiator commands can be sorted into flow queues 436 based on a hash function. One of flow queues 436 can be allocated to a unique flow. Furthermore, command queue unit 430 can further include a triggered operations module (or logic block) 438, which is responsible for queuing and dispatching triggered commands.

Outbound transfer engine (OXE) 440 can pull commands from flow queues 436 in order to process them for dispatch. Outbound transfer engine 440 can include an address translation request unit (ATRU) 444 that can send address translation requests to address translation unit (ATU) 412. ATU 412 can provide virtual to physical address translation on behalf of different engines, such as outbound transfer engine 440, inbound transfer engine (IXE) 450, and event engine (EE) 416. ATU 412 can maintain a large translation cache 414. ATU 412 can either perform translation itself or may use host-based address translation services (ATS). Outbound transfer engine 440 can also include message chopping unit (MCU) 446, which can fragment a large message into packets of sizes corresponding to a maximum transmission unit (MTU). MCU 446 can include a plurality of MCU modules. When an MCU module becomes available, the MCU module can obtain the next command from an assigned flow queue. The received data can be written into data buffer 442. The MCU module can then send the packet header, the corresponding traffic class, and the packet size to traffic shaper 448. Shaper 448 can determine which requests presented by MCU 446 can proceed to the network.

Subsequently, the selected packet can be sent to packet and connection tracking (PCT) 470. PCT 470 can store the packet in a queue 474. PCT 470 can also maintain state information for outbound commands and update the state information as responses are returned. PCT 470 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 472. PCT 470 can facilitate connection management for initiator and target commands based on source tables 476 and target tables 478, respectively. For example, PCT 470 can update its source tables 476 to track the necessary state for reliable delivery of the packet and message completion notification. PCT 470 can forward outgoing packets to High-Speed Network Interface 406, which stores the packets in outbound queue 422.

In some examples, the status of the transmitted data packets and the rejection message transmitted by target device and received by source device may be maintained by PCT 470. For example, PCT 470 can maintain packet state information of the data packet as it is transmitted (at PCT 470 of source device), received (at PCT 470 of target device), and rejected (at PCT 470 of target device).

NIC 400 can also include Inbound Transfer Engine 450, which provides packet processing if NIC 400 is a source or a target. Inbound transfer engine 450 can obtain the incoming packets from High-Speed Network Interface 406. Parser 456 can parse the incoming packets and pass the corresponding packet information to a List Processing Engine (LPE)

464 or a Message State Table (MST) 466 for matching. LPE 464 can match incoming messages to buffers. LPE 464 can determine the buffer and start address to be used by each message. LPE 464 can also manage a pool of list entries 462 used to represent buffers and unexpected messages. MST 466 can store matching results and the information required to generate target side completion events. MST 466 can be used by unrestricted operations, including multi-packet PUT commands, and single-packet and multi-packet GET commands.

Subsequently, parser 456 can store the packets in packet buffer 454. Inbound transfer engine 450 can obtain the results of the matching for conflict checking. Direct Memory Access (DMA) write and Atomic Memory Operations (AMO) module 452 can then issue updates to the memory generated by DMA write and AMO operations. If a packet includes a command that generates target side memory read operations (e.g., a GET response), the packet can be passed to the outbound transfer engine 440. NIC 400 can also include event engine 416, which can receive requests to generate event notifications from other modules or units in NIC 400. An event notification can specify that either a fill event or a counting event is generated. Event engine 416 can manage event queues, located within host processor memory, to which it writes full events. Event engine 416 can forward counting events to command queue unit 430.

Figure 5:
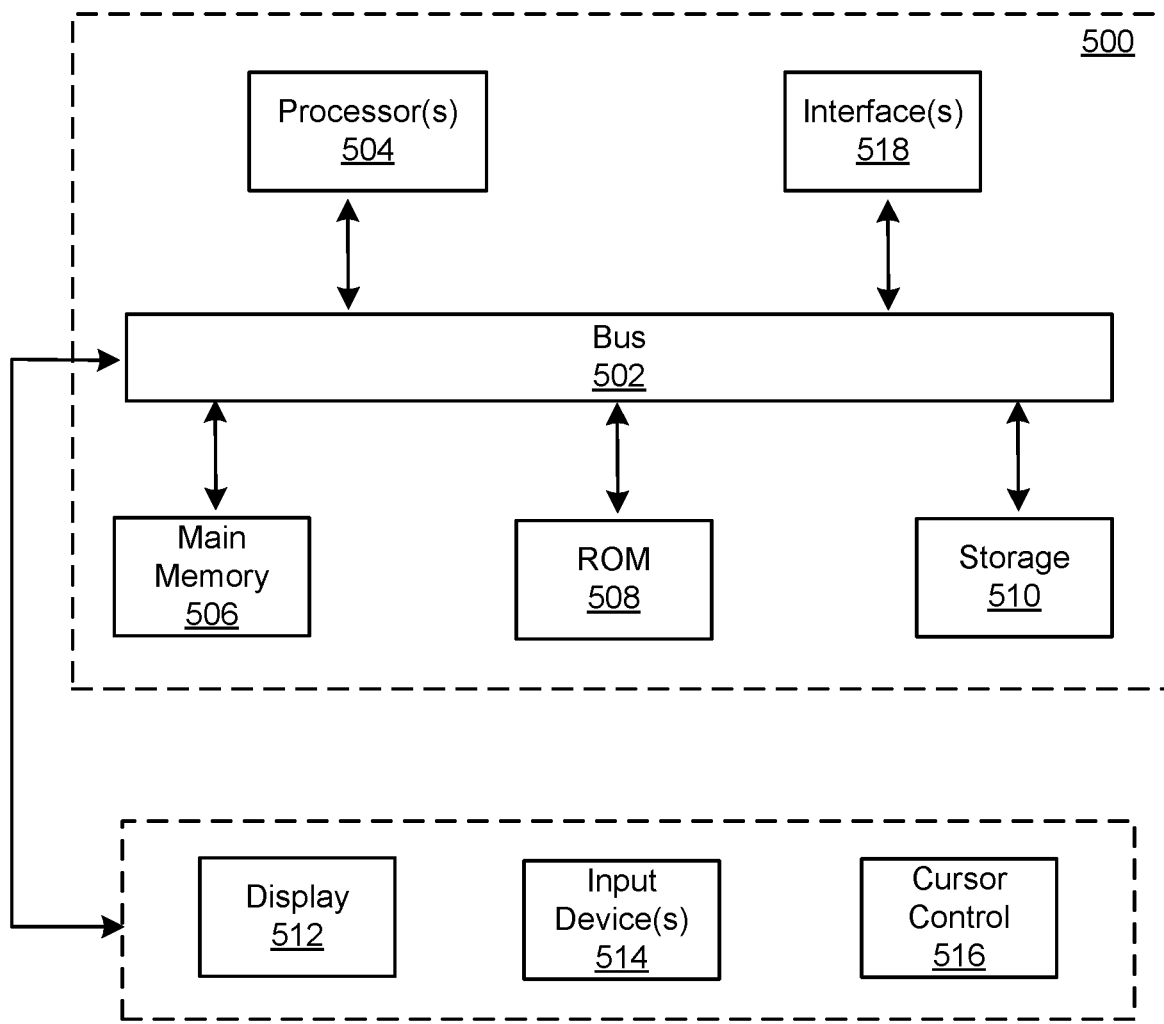
FIG. 5 depicts a block diagram of an example computer system in which various of the examples described herein may be implemented.

FIG. 5 depicts a block diagram of an example computer system 500 in which various of the examples described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some examples, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one example, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   transmitting a series of data packets from a source device to a target device, at least one data packet in the series of data packets comprising a first shared token;
   closing a first communication connection via a communication network at a first time between the source device and the target device, the first shared token being stored by the target device after the first communication connection is closed;
   encrypting, by the source device, a portion of a first data packet using a key stored at a network interface card (NIC) of the source device, the first data packet corresponding with a request by the source device;
   initiating a second communication connection, by the source device at a second time after the first time;
   transmitting, by the source device to the target device, the first data packet to the target device, and the first data packet comprising a first shared token within the encrypted portion of the first data packet;

receiving, by the source device from the target device, a rejection message in response to transmitting the first data packet that includes a second shared token in an encrypted portion of the rejection message;

decrypting, by the source device, the rejection message to determine the second shared token; and establishing, by the source device, a third communication connection between the source device and the target device via the communication network to transmit a second data packet comprising the second shared token.

2. The method of claim 1, wherein the first communication connection and the second communication connection between the source device and the target device is inactive when the first data packet is transmitted.

3. The method of claim 1, wherein the rejection message is based on the first shared token being expired.

4. The method of claim 1, wherein the first shared token and the second shared token correspond with a sequence number established during a previous connection between the source device and the target device.

5. The method of claim 1, wherein the first shared token and the second shared token correspond with a current time synchronized across the source device and the target device.

6. The method of claim 1, wherein the first shared token and the second shared token correspond with a list of usable tokens where usage of each of the usable tokens is tracked by the source device and the target device.

7. The method described in claim 1, wherein the key is delivered from a key server prior to transmitting the first data packet using the second communication connection.

8. The method described in claim 1, wherein the key is delivered as an encrypted key.

9. A source device comprising:

a memory; and a processor that is configured to execute machine readable instructions stored in the memory that when executed by the processor cause the processor to:

transmit a series of data packets from a source device to a target device, at least one data packet in the series of data packets comprising a first shared token;

close a first communication connection via a communication network at a first time between the source device and the target device, the first shared token being stored by the target device after the first communication connection is closed;

encrypt a portion of a first data packet using a key stored at a network interface card (NIC) of the source device, the first data packet corresponding with a request by the source device;

initiate a second communication connection, by the source device at a second time after the first time;

transmit, to the target device, the first data packet to the target device, and the first data packet comprising a first shared token within the encrypted portion of the first data packet;

receive, from the target device, a rejection message in response to transmitting the first data packet that includes a second shared token in an encrypted portion of the rejection message;

decrypt the rejection message to determine the second shared token; and establish a third communication connection between the source device and the target device via the communication network to transmit a second data packet comprising the second shared token.

10. The source device of claim 9, wherein the first communication connection and the second communication connection between the source device and the target device is inactive when the first data packet is transmitted.

11. The source device of claim 9, wherein the rejection message is based on the first shared token being expired.

12. The source device of claim 9, wherein the first shared token and the second shared token correspond with a sequence number established during a previous connection between the source device and the target device.

13. The source device of claim 9, wherein the first shared token and the second shared token correspond with a current time synchronized across the source device and the target device.

14. The source device of claim 9, wherein the first shared token and the second shared token correspond with a list of usable tokens where usage of each of the usable tokens is tracked by the source device and the target device.

15. The source device of claim 9, wherein the key is delivered from a key server prior to transmitting the first data packet using the second communication connection.

16. The source device of claim 9, wherein the key is delivered as an encrypted key.

17. A non-transitory computer-readable storage medium storing a plurality of instructions executable by a processor, the plurality of instructions when executed by the processor cause the processor to:

transmit a series of data packets from a source device to a target device, at least one data packet in the series of data packets comprising a first shared token;

close a first communication connection via a communication network at a first time between the source device and the target device, the first shared token being stored by the target device after the first communication connection is closed;

encrypt a portion of a first data packet using a key stored at a network interface card (NIC) of the source device, the first data packet corresponding with a request by the source device;

initiate a second communication connection, by the source device at a second time after the first time;

transmit, to the target device, the first data packet to the target device, and the first data packet comprising a first shared token within the encrypted portion of the first data packet;

receive, from the target device, a rejection message in response to transmitting the first data packet that includes a second shared token in an encrypted portion of the rejection message;

decrypt the rejection message to determine the second shared token; and establish a third communication connection between the source device and the target device via the communication network to transmit a second data packet comprising the second shared token.

18. The non-transitory computer-readable storage medium of claim 17, wherein the first communication connection and the second communication connection between the source device and the target device is inactive when the first data packet is transmitted.

19. The non-transitory computer-readable storage medium of claim 17, wherein the rejection message is based on the first shared token being expired.

20. The non-transitory computer-readable storage medium of claim 17, wherein the first shared token and the second shared token correspond with a sequence number established during a previous connection between the source device and the target device.

* * * * *